United States Patent
Nakao et al.

(10) Patent No.: US 8,693,075 B2
(45) Date of Patent: Apr. 8, 2014

(54) SCAN TYPE IMAGE DISPLAY DEVICE

(75) Inventors: Takeshi Nakao, Sagamihara (JP);
Kunikazu Ohnishi, Yokosuka (JP);
Hiromi Kita, Hiratsuka (JP); Norio Hosaka, Yokohama (JP)

(73) Assignee: Hitachi Media Electronics Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 13/450,507

(22) Filed: Apr. 19, 2012

(65) Prior Publication Data
US 2012/0275002 A1    Nov. 1, 2012

(30) Foreign Application Priority Data
Apr. 27, 2011 (JP) .................................. 2011-099820

(51) Int. Cl.
*G02B 26/12* (2006.01)
(52) U.S. Cl.
USPC ................ 359/204.3; 359/201.2; 359/298
(58) Field of Classification Search
USPC ......... 348/757; 359/200.1, 201.2, 204.3, 301, 359/485.04, 242, 567
See application file for complete search history.

(56) References Cited

U.S. PATENT DOCUMENTS

| 4,084,188 A | * | 4/1978 | Gorog et al. | 358/479 |
| 5,377,036 A | * | 12/1994 | Appel et al. | 359/216.1 |
| 5,526,165 A | * | 6/1996 | Toda et al. | 359/202.1 |
| 6,902,310 B2 | * | 6/2005 | Im | 362/558 |
| 7,151,632 B2 | * | 12/2006 | Biss et al. | 359/371 |
| 7,256,917 B2 | * | 8/2007 | Ishihara | 359/202.1 |
| 2005/0117188 A1 | | 6/2005 | Ishihara | |
| 2009/0147224 A1 | * | 6/2009 | Kurozuka et al. | 353/98 |
| 2011/0025930 A1 | * | 2/2011 | Sprague et al. | 348/757 |

FOREIGN PATENT DOCUMENTS

| JP | 2006-47804 | 2/2006 |
| JP | 2006-189573 | 7/2006 |
| JP | 2009-533715 | 9/2009 |
| JP | 4481625 | 3/2010 |
| JP | 4639691 | 12/2010 |
| WO | WO 2007/120831 A2 | 10/2007 |

* cited by examiner

*Primary Examiner* — Evelyn A. Lester
*Assistant Examiner* — William Alexander
(74) *Attorney, Agent, or Firm* — Antonelli, Terry, Stout & Kraus, LLP.

(57) ABSTRACT

Optical beams emitted by optical sources are incident on a mirror surface of a scan mirror in a substantially vertical direction and reflected in a substantially vertical direction by the scan mirror. The mirror surface of the scan mirror is driven to repeatedly rotate two-dimensionally by a predetermined scan angle by a scan mirror drive circuit. A polarized beam splitter causes the optical beam emitted by the optical source to be incident on the scan mirror through a quarter wave plate, and outputs the optical beam that has been reflected by the scan mirror and passed through the quarter wave plate toward the screen. A scan angle expander is arranged on the output side of the polarized beam splitter, whereby the scan angle of the optical beam is increased by N times.

5 Claims, 4 Drawing Sheets

SCAN TYPE IMAGE DISPLAY DEVICE

CLAIM OF PRIORITY

The present application claims priority from Japanese patent application serial No. JP2011-099820, filed on Apr. 27, 2011, the content of which is hereby incorporated by reference into this application.

BACKGROUND OF THE INVENTION (1) Field of the Invention

The present invention relates to a scan type image display device that uses a scan mirror to two-dimensionally scan the screen with an optical beam to thereby display an image on the screen.

(2) Description of the Related Art

Recently, a scan type image display device has been proposed which modulates the intensity of an optical beam emitted by a laser optical source according to an image signal and two-dimensionally scans the screen with the optical beam, thereby displaying an image using the afterimage effect. The micro electro mechanical systems (MEMS) mirror is known as a scan unit employed in such scan type image display devices. The MEMS mirror is such that its mirror surface rotates to two-dimensionally scan the screen with an optical beam emitted from the light source (refer to, for example, JP-A-2006-189573 and JP-A-2009-533715). The MEMS mirror is hereinafter referred to as a "scan mirror".

FIG. 6 of JP-A-2006-189573 and FIG. 20 of JP-A-2009-533715 each illustrate a configuration in which a beam is incident on the scan mirror in a nearly vertical direction (the incident angle is approximately 0) so as to enlarge the deflection angle of the beam relative to the rotational angle of the mirror surface. In this case, light incident on the scan mirror and light reflected by the scan mirror take a common optical path. Therefore, the optical beam to be projected is polarized into a linear polarized beam, and a polarized beam splitter (PBS) and a quarter wave plate are arranged in the optical path to thereby separate the paths of the incident light and the reflected light.

SUMMARY OF THE INVENTION

In the scan type image display device, the distortion in a display image on the screen depends on the angle of incidence of the optical beam on the scan mirror. It is known that when an optical beam is incident on the scan mirror from an oblique direction, the distortion will be large. Distortion of the image can be reduced when the optical beam is incident on the scan mirror in the vertical direction. However, when the incident direction is vertical, it is necessary to newly dispose a polarized beam splitter (PBS) in order to separate the paths of the incident light and the reflected light. The PBS includes a reflective film that reflects (or passes) linear polarized beams at a specific wavelength or wavelength within a specific range. Meanwhile, the PBS has a feature such that the reflectance (or transmittance) varies depending on the angle of incidence of the optical beam on the reflective film.

In order to improve image resolution in the scan type image display device, the scan angle (deflection angle) of the beam with respect to the screen needs to be large. That is, to increase the ratio of the display size to the beam size on the screen, the scan angle of the scan mirror (rotational angle of the mirror surface) needs to be increased. When the scan angle of the scan mirror is large, the angle of incidence of the beam on the reflective film in the PBS will be increased, which makes it difficult to obtain a desired reflectance or transmittance. For example, if the optical characteristic (reflectance or transmittance) of the reflective film is optimal when the incident angle of the beam is 45°, the reflectance or transmittance would be reduced as the incident angle deviates from 45° by more than the range of ±10°. As a result, the intensity of the outgoing beams at the peripheral area of the display screen becomes insufficient so that the luminance decreases, and intensity distribution occurs in the screen.

An object of the present invention is to provide a scan type image display device that suppresses image distortion and luminance reduction at the peripheral area of the screen when an image is displayed in high resolution.

One aspect of the present invention provides a scan type image display device which scans a screen with an optical beam and displays an image on the screen, comprising: an optical source which emits an optical beam; an optical source drive circuit which controls the intensity of the optical beam emitted by the optical source according to an image signal; a scan mirror which has a mirror surface on which the optical beam is incident in a substantially vertical direction, the scan mirror reflecting the incident optical beam in a substantially vertical direction; a scan mirror drive circuit which drives the mirror surface of the scan mirror such that the mirror surface repeatedly two-dimensionally rotates by a predetermined scan angle; a polarized beam splitter which causes the optical beam emitted by the optical source to be incident on the scan mirror through a quarter wave plate, the polarized beam splitter also outputting toward the screen the optical beam that has been reflected by the scan mirror and passed through the quarter wave plate; and a scan angle expander which increases a scan angle of the optical beam output from the polarized beam splitter by N times.

According to the present invention, change in the optical characteristic (reflectance or transmittance) of the polarized beam splitter can be suppressed by reducing the scan angle of the scan mirror. Reduction of screen brightness can therefore be prevented. In addition, it is possible to increase the angle at which the beam is projected on the screen by means of the scan angle expander, whereby a high-resolution and high-quality image can be displayed.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF EMBODIMENT

Embodiments of the present invention are described below with reference to the accompanying drawings.

First Embodiment

Figure 1:
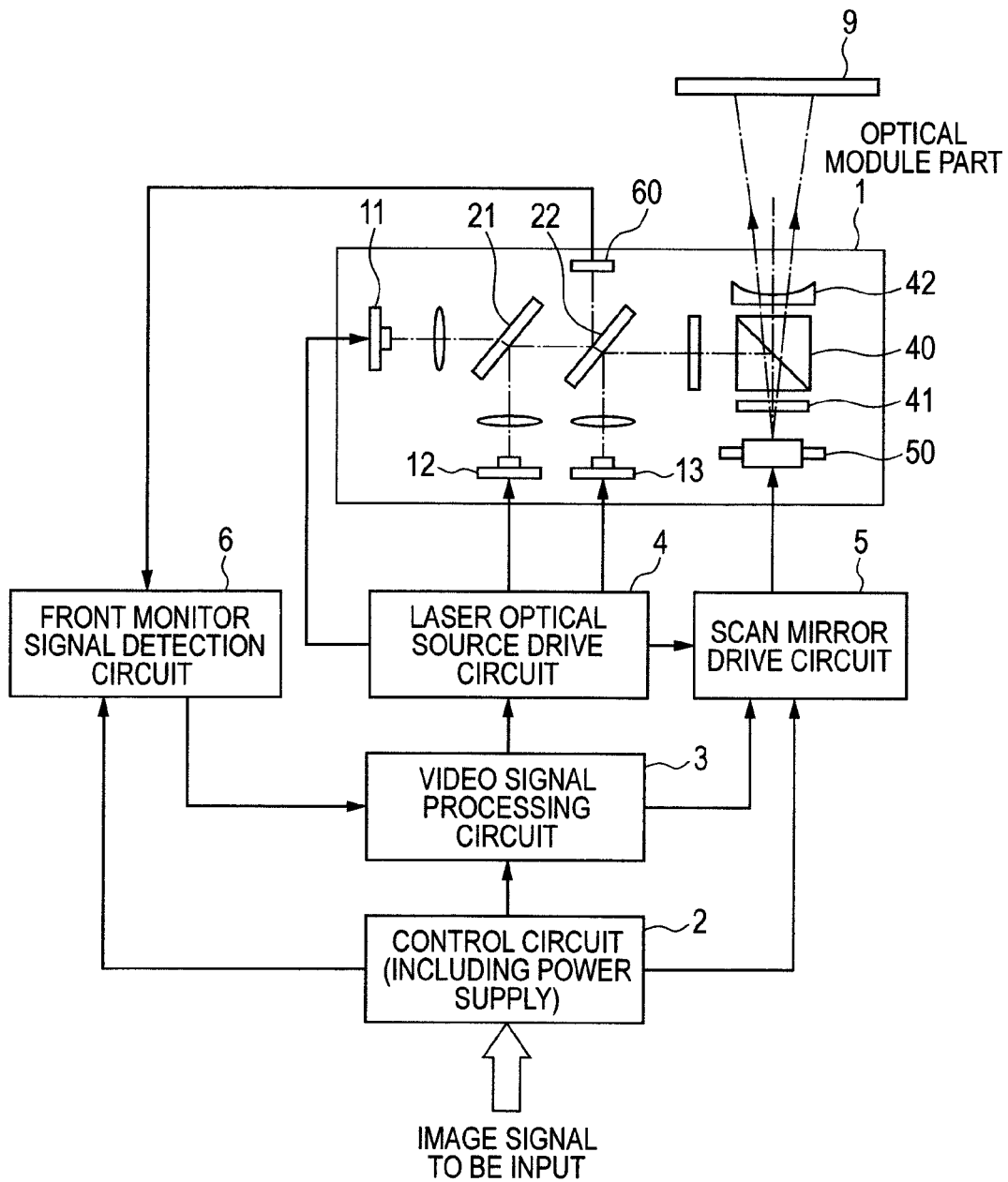
FIG. 1 is a diagram illustrating the entire configuration of a scan type image display device according to a first embodiment of the present invention.

FIG. 1 is a diagram illustrating the entire configuration of a scan type image display device according to a first embodiment of the present invention.

An optical module part 1 includes: laser optical sources 11, 12, and 13 that respectively emit a green (G), red (R), and blue (B) beam; an optical combining part that combines the optical beams emitted by the laser optical sources; a projection part that projects the combined optical beam on a screen 9; and a scan part that two-dimensionally scans the screen 9 with the optical beam. The optical combining part includes dichroic mirrors 21 and 22. The projection part includes a polarized beam splitter (PBS) 40, a quarter wave plate 41, and a scan angle expander 42. The scan part includes a scan mirror 50. The configuration of the optical module part 1 will be further described later with reference to FIG. 2.

An image signal to be displayed is input to a video signal processing circuit 3 through a control circuit 2 including a power supply. In the video signal processing circuit 3, the image signal is subjected to various processes, and is separated into three color signals (RGB signals) to be transmitted to a laser optical source drive circuit 4. In the laser optical drive circuit 4, according to the intensity value of each of the RGB signals, drive currents for light emission is supplied to the laser optical sources 11, 12, and 13 in the optical module part 1. The laser optical sources 11, 12, and 13 then emit optical beams with intensities corresponding to the intensity values of the RGB signals.

In addition, the video signal processing circuit 3 extracts a synchronization signal from the image signal and transmits the synchronization signal to a scan mirror drive circuit 5. The scan mirror drive circuit 5 supplies, in accordance with the horizontal/vertical synchronization signal, a drive signal to the scan mirror 50 in the optical module part 1 so that the mirror surface of the scan mirror 50 repeatedly two-dimensionally rotates. The scan mirror 50 thus repeatedly rotates its mirror surface periodically by predetermined angles, whereby the optical beam is reflected by the mirror surface so as to scan the screen 9 in the horizontal and vertical directions to display the image.

A front monitor signal detection circuit 6 receives a signal from a front monitor 60 in the optical module part 1 and detects the output level of each of the RGB beams emitted by the laser optical sources 11, 12, and 13. The detected levels are input into the video signal processing circuit 3 to control outputs of the laser optical sources 11, 12 and 13 such that they meet the desired levels.

The scan type image display device according to this embodiment displays high-resolution and high-quality images. Specifically, the display device according to this embodiment displays images in high-resolution XGA mode (1024×768 pixels) as well as in conventional VGA mode. Thus, the angular width of an optical beam projected on the screen 9 (hereinafter referred to as a "deflection angle") may be increased to as large as, for example, $\theta h=\pm 24°$ in the horizontal direction and $\theta v=\pm 18°$ in the vertical direction. If the deflection angle is to be achieved directly from the angular width of the rotation of the scan mirror 50 (hereinafter referred to as a "scan angle"), the angle of incidence of the beam on the PBS 40 would change corresponding to the deflection angle. The optical characteristic of the PBS 40 then inevitably changes (deteriorates). As a result, the intensity of the outgoing beams at the peripheral area of the display screen would be insufficient and the luminance would be reduced. To avoid this, in this embodiment, the scan angle of the scan mirror 50 is reduced to 1/N of the deflection angle required for high-resolution image display. Assuming that N=2, for example, the scan angle is reduced to $\theta h=\pm 12°$ in the horizontal direction and $\theta v=\pm 9°$ in the vertical direction, at which angular width the optical characteristic of the PBS 40 does not change. The scan angle expander 42 is arranged on the side to which the optical beam that has been reflected by the scan mirror 50 and passed through the PBS 40 exits. The scan angle expander 42 increases the angle of the beam projected from the PBS 40 by N times (e.g., N=2), thereby ensuring the deflection angle required to project a high-resolution image on the screen 9.

Figure 2:
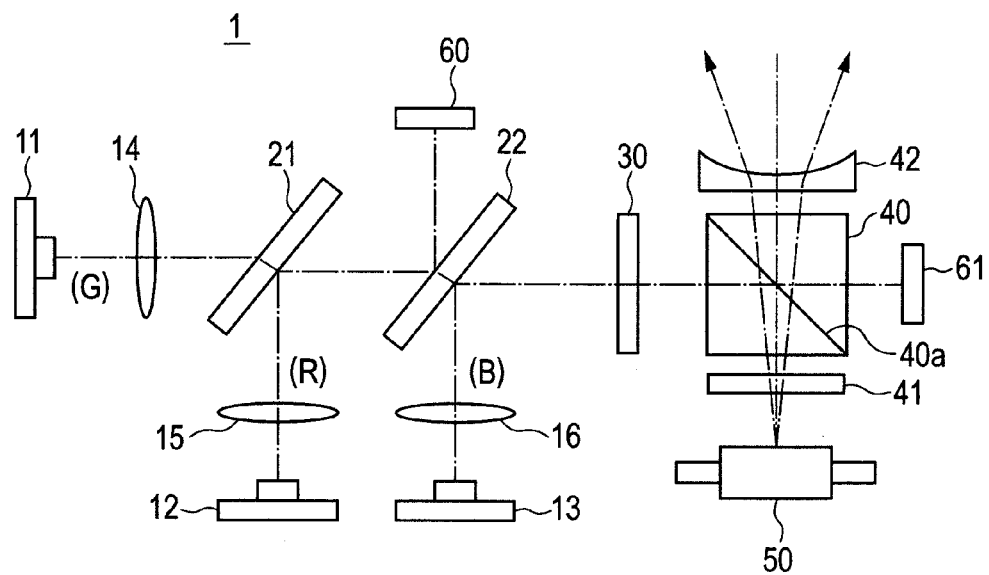
FIG. 2 is a diagram illustrating a detailed configuration of an optical module part 1 illustrated in FIG. 1.

FIG. 2 is a diagram illustrating a detailed configuration of the optical module part 1 shown in FIG. 1. In the optical module part 1, the laser optical source 11 emits a G optical beam (520 nm wavelength band), the laser optical source 12 emits an R optical beam (640 nm wavelength band), and the laser optical source 13 emits a B optical beam (440 nm wavelength band). The optical beams are converted into substantially parallel optical beams by collimating lenses 14, 15, and 16. The dichroic mirror 21 passes the G optical beam and reflects the R optical beam. The dichroic mirror 22 passes the G optical beam and the R optical beam, and reflects the B optical beam. The R, G, and B optical beams are combined to form a single combined optical beam by adjusting the inclinations and positions of their optical axes so that their cross-sections overlap with each other. The arrangement of the laser optical sources 11, 12, and 13 shown in FIG. 2 that emit RGB beams is here determined in view of optical efficiency: the arrangement is not limited to this and may be changed as appropriate.

A speckle noise reduction device 30 is a device that reduces speckle noise in the laser optical beam caused by interference with a feed back beam from an optical part through which the laser optical beam passes. The speckle noise reduction device 30 may be made up of a liquid crystal device, for example. Front monitors 60 and 61 detect the intensities of the R, G, and B optical beams propagating through the optical path. One of the front monitors, the front monitor 61 may be omitted.

The combined optical beam enters the polarized beam splitter (PBS) 40 in which it is reflected by the reflective film 40a. The reflected beam passes through the quarter wave plate 41 and is incident on the scan mirror 50 in a substantially vertical direction. The scan mirror 50 is constituted by, for example, a so-called MEMS mirror. The scan mirror 50 repeatedly rotates its mirror surface two-dimensionally at a predetermined scan angle, thereby reflecting the incident optical beam in a substantially vertical direction within the range of the scan angle. The reflected optical beam passes through the reflective film 40a in the PBS 40 and enters the scan angle expander 42. The scan angle expander 42 may be a concave lens such as those used for projectors or the like, or an optical system for expanding the scan angle composed of a combination of a plurality of lenses. The scan angle expander 42 expands the scan angle of the optical beam incident from the PBS 40 by N times and outputs the optical beam, thereby projecting an image on the screen 9.

Figure 3:
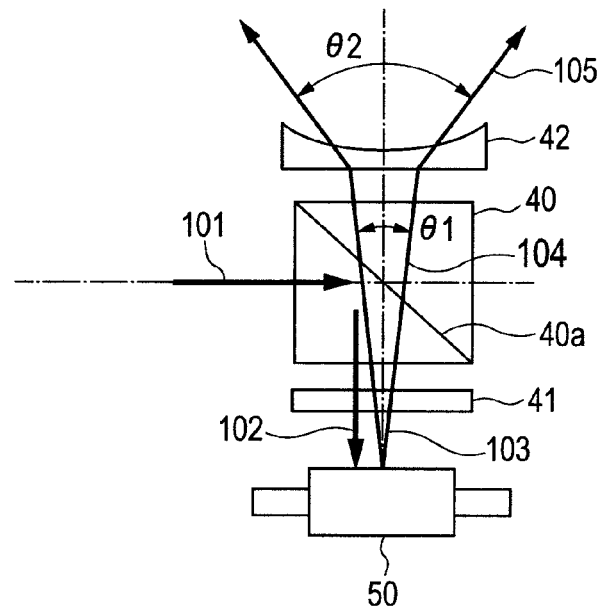
FIG. 3 is a diagram illustrating operations of a scan part and a projection part included in the optical module part 1.

FIG. 3 is a diagram illustrating the operations of the scan part and the projection part in the optical module part 1. An optical beam 101 is the combination of the three optical beams emitted by the laser optical sources 11, 12 and, 13. The optical beam 101 enters the PBS 40 as an S-polarized optical beam. There are various methods for converting the polarization of the incident beam to S-polarization: for example, polarization plates may be disposed on the output sides of the laser optical sources or on the output sides of the collimating lenses; or the laser optical sources themselves may be rotated and attached. The essence of the present invention would not change regardless of which method is used. The reflective film 40a of the PBS 40 reflects S-polarized light and passes P-polarized light. Thus, the S-polarized optical beam 101 is reflected by the reflective film 40a and enters the quarter wave plate 41. The S-polarized optical beam 101 is converted into a generally circular polarized optical beam 102 by the quarter wave plate 101. The generally circular polarized optical beam 102 is incident on the scan mirror 50 in a substantially vertical direction.

The scan mirror 50 reflects the optical beam 102 such that the reflected optical beam 103 swings at the predetermined scan angle ($\theta 1h$ in the horizontal direction and $\theta 1v$ in the vertical direction). The optical beam 103 passes through the quarter wave plate 41 again, whereby it is converted from the substantially circularly polarized optical beam into a P-polarized optical beam 104. The P-polarized optical beam 104 enters the PBS 40, passes through the reflective film 40a, and then enters the scan angle expander 42. The scan angle expander 42 converts the optical beam 104 incident at the scan angle ($\theta 1h$, $\theta 1v$) into an optical beam 105 having N times the scan angle ($\theta 2h = N \times \theta 1h$ in the horizontal direction and $\theta 2v = N \times \theta 1v$ in the vertical direction), and outputs the optical beam 105. Thus, the scan angle (deflection angle) of the beam projected on the screen 9 would be $\theta 2h$ in the horizontal direction and $\theta 2v$ in the vertical direction.

As described above, in the optical module part 1 according to this embodiment, the scan angle ($\theta 1h$, $\theta 1v$) of the scan mirror 50 can be reduced to 1/N of the deflection angle ($\theta 2h = \pm 24°$, $\theta 2v = \pm 18°$). When a scan angle expander 42 of which expansion ratio N is two is used, an image is displayed in the high-resolution XGA mode with the scan angle of the scan mirror 50 decreased to $\theta 1h = \pm 12°$ and $\theta 1v = \pm 9°$. Since the deviation of the angle of incidence of the optical beam on the reflective film 40a in the PBS 40 is reduced to the scan angle ($\theta 1h$, $\theta 1v$), the optical characteristic of the PBS 40 would not change. Decrease of screen luminance can therefore be prevented.

Figure 6:
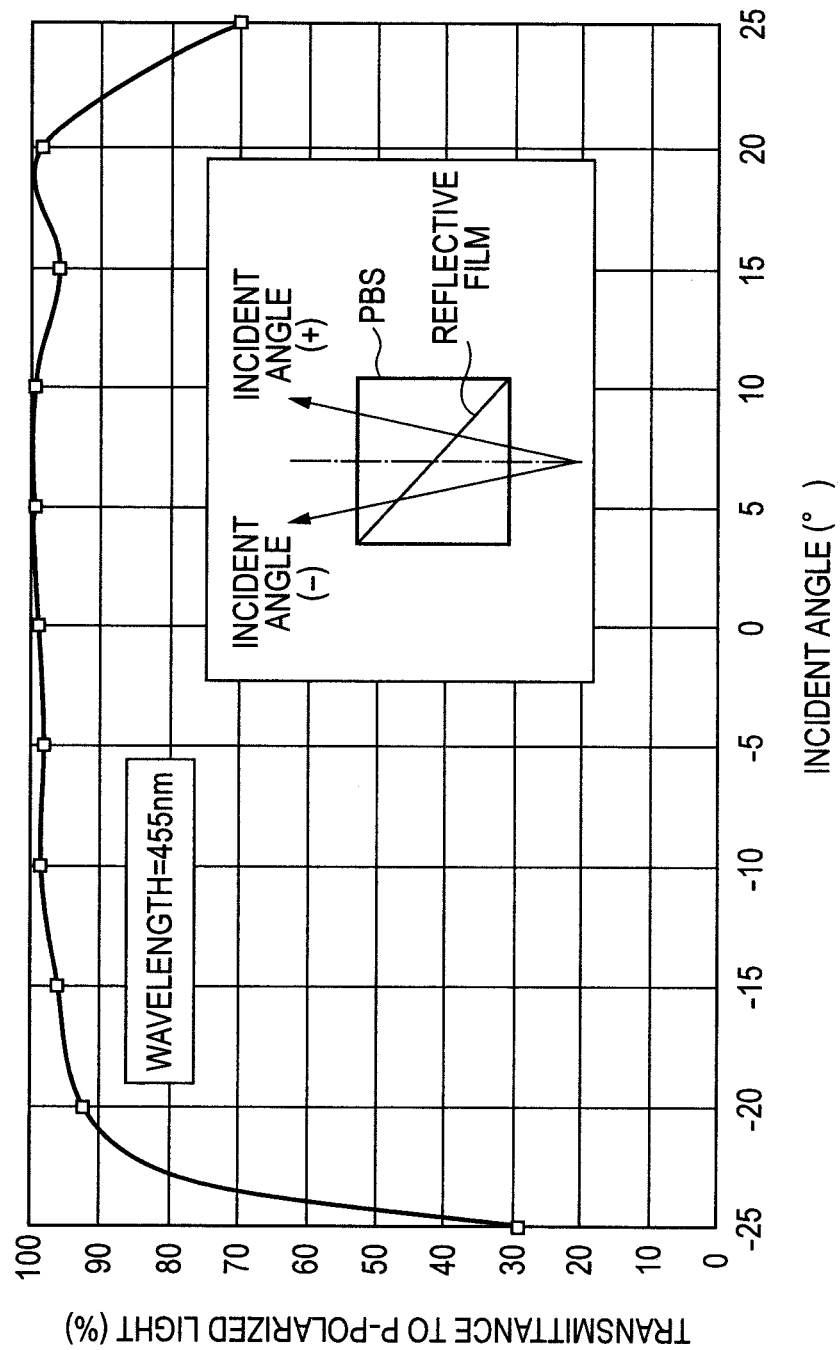
FIG. 6 is a diagram illustrating an example of the dependency relation of the transmittance of a reflective film in a PBS on the incident angle.

The optical characteristic of the reflective film 40a of the PBS 40 is described below. FIG. 6 is a diagram showing an example of the dependency relation of the transmittance of the reflective film 40a in the PBS 40 on the incident angle of the beam. The ordinate represents the transmittance of the reflective film 40a to a P-polarized optical beam at a wavelength of 455 nm, and the abscissa represents the incident angle with respect to the reflective film that is inclined at 45°. The change in transmittance of when the incident angle is on the positive side is asymmetric with that of when the incident angle is on the negative side. This is because the beam axis approaches the normal of the reflective film as the incident angle increases in the positive side, whereas the beam axis departs from the normal of the reflective film as the incident angle decreases in the negative side. In either of the sides, when the incident angle falls outside the range of $\pm 10°$, the transmittance begins to decrease. The decrease in transmittance is particularly notable in the negative side. Therefore, not only the brightness of the displayed image is reduced but also the brightness of the right and left parts of the display screen would be unbalanced. Assuming that the reflective film 40a exhibits the characteristic shown in FIG. 6, and allowing for factors such as wavelength dependency and manufacturing variations, the practicable incident angle range would be within about $\pm 15°$. That is, the scan angle of the scan mirror 50 is required to be in a range of $\pm 15°$. Thus, it can be said that there is no problem when the scan angle of the scan mirror 50 is at the above reduced angle ($\theta 1h = \pm 12°$, $\theta 1v = \pm 9°$). Incidentally, when the reflective film 40a of the PBS 40 has a different optical characteristic, the expansion ratio N of the scan angle expander 42 can be set according to the practicable incident angle range.

Further, it is not to mention that since the optical beam is incident on the scan mirror 50 in a substantially vertical direction in the configuration of this embodiment, distortion of an image displayed on the screen can be suppressed as well.

Second Embodiment

Figure 4:
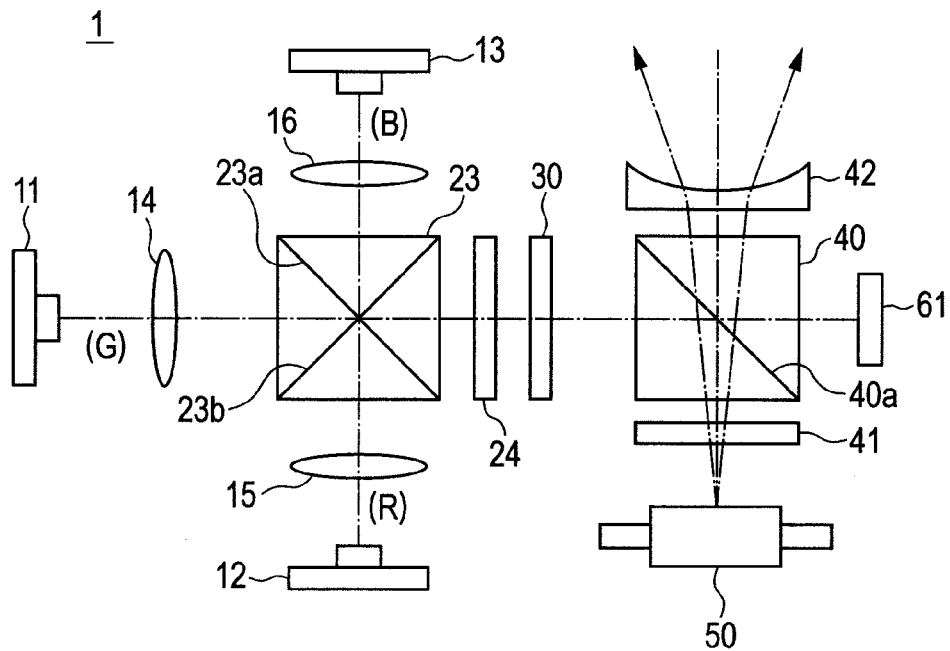
FIG. 4 is a diagram illustrating the configuration of an optical module part 1 according to a second embodiment of the present invention.

FIG. 4 is a diagram illustrating the configuration of an optical module part 1 in a scan type image display device according to a second embodiment of the present invention. The optical module part 1 according to the second embodiment is different from the first embodiment (shown in FIG. 2) in the configuration of the optical combining part. The scan part and the projection part have the same configurations as those in the first embodiment. The points different from the first embodiment shown in FIG. 2 are described below.

The arrangement of the laser optical sources 11, 12, and 13 is changed in the second embodiment. The optical module part 1 of this embodiment includes a cross prism 23 which combines the optical beams, and a dichroic polarization rotator 24. The cross prism 23 has dichroic films 23a and 23b formed so as to cross each other. The dichroic polarization rotator 24 rotates the polarization of optical beams of a specific color.

The G optical beam emitted by the laser optical source 11 is polarized by a polarization plate (not illustrated) or the like and enters the cross prism 23 as P-polarized light. The R and B optical beams emitted by the laser optical sources 12 and 13 are polarized by polarization plates (not illustrated) or the like and enter the cross prism 23 as S-polarized light. The dichroic film 23a in the cross prism 23 reflects B light, and the dichroic film 23b in the cross prism 23 reflects R light. Therefore, the G optical beam emitted by the laser optical source 11 passes through the dichroic films 23a and 23b, whereas the R and B optical beams emitted by the laser optical sources 12 and 13 are reflected by the dichroic films 23a and 23b. In the cross prism 23, considering the spectral characteristics of the dichroic films 23a and 23b, the so-called SPS combination using S-polarized R and B optical beams and a P-polarized G optical beam is performed. The optical combining can thus be done efficiently. Incidentally, in order to polarize the optical beams emitted by the laser optical sources to predetermined polarizations, the laser optical sources themselves may be rotated.

The combined optical beam enters the dichroic polarization rotator 24. The dichroic polarization rotator 24 rotates the polarization of the G optical beam component to convert it from P-polarization to S-polarization, whereas the R and B optical beam components directly pass through the dichroic polarization rotator 24 as S-polarized optical beam components. As a result, the optical beam components that have passed through the dichroic polarization rotator 24 would all be S-polarized. The optical beam enters the PBS 40 through the speckle noise reduction device 30. The scan mirror 50 then scans the screen with the optical beam so as to project the optical beam on the screen through the scan angle expander 42.

According to this embodiment, the laser optical sources 11, 12, and 13 are arranged in three directions facing three sides of the cross prism 23. This embodiment therefore produces, in addition to the effect of the first embodiment, an effect of reducing the length of the optical module part 1, in other words, the distance between the laser optical source 11 and the front monitor 61.

Third Embodiment

Figure 5:
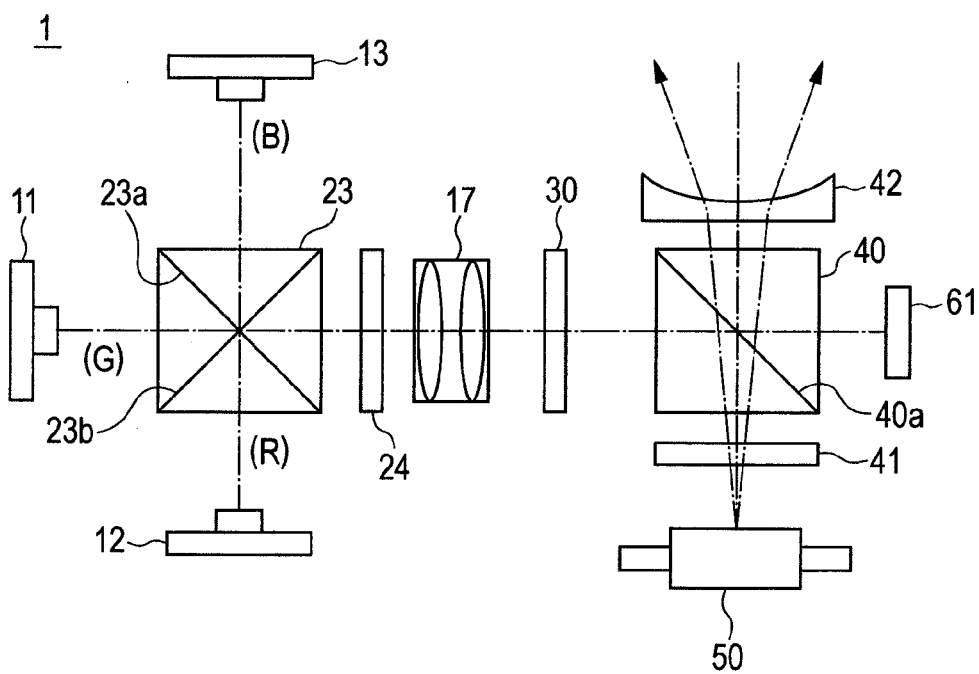
FIG. 5 is a diagram illustrating the configuration of an optical module part 1 according to a third embodiment of the present invention.

FIG. 5 is a diagram illustrating the configuration of an optical module part 1 in a scan type image display device according to a third embodiment of the present invention. The optical module part 1 according to the third embodiment is different from the second embodiment (illustrated in FIG. 4) in the configuration of the collimating lens in the optical combining part. The other parts are the same as those in the second embodiment. The points different from the second embodiment illustrated in FIG. 4 are described below.

In this embodiment, instead of the individual collimating lenses 14 to 16, a common collimating lens 17 is arranged between the dichroic polarization rotator 24 and the speckle noise reduction device 30 to convert the optical beams emitted by the laser optical sources 11, 12, and 13 into parallel optical beams. As the common collimating lens 17, a so-called achromatic lens is used, which corrects the chromatic aberrations according to the differences among the wavelengths of the optical beams emitted by the laser optical sources 11, 12, and 13. The position of each of the laser optical sources 11, 12, and 13 is arranged to be at the focal point of the common collimating lens 17 relative to the wavelength of the beam, according to the deviation of the focal point corresponding to the wavelength.

According to this embodiment, in addition to the effects of the first and second embodiments, a common collimating lens is disposed for the optical beams emitted by the laser optical sources. The number of components can thus be reduced.

In the second and third embodiments, the cross prism 23 is used for combine the R, G and B optical beams. However, the present invention is not limited to this configuration. In spite of prism form, a combined mirror, which includes the mirrors which have an effect equivalent to a cross prism 23, can also be used. In this case, the same effect as the above may be obtained.

What is claimed is:

1. A scan type image display device which scans a screen with an optical beam and displays an image on the screen, comprising:
    an optical source which emits an optical beam;
    an optical source drive circuit which controls the intensity of the optical beam emitted by the optical source according to an image signal;
    a scan mirror which has a mirror surface on which the optical beam is incident in a substantially vertical direction, the scan mirror reflecting the incident optical beam in a substantially vertical direction;
    a scan mirror drive circuit which drives the mirror surface of the scan mirror such that the mirror surface repeatedly two-dimensionally rotates by a predetermined scan angle;
    a polarized beam splitter which causes the optical beam emitted by the optical source to be incident on the scan mirror through a quarter wave plate, the polarized beam splitter also outputting toward the screen the optical beam that has been reflected by the scan mirror and passed through the quarter wave plate;
    a scan angle expander which increases a scan angle of the optical beam output from the polarized beam splitter by N times, where N is a number greater than 1; and
    a speckle noise reduction device disposed on the side from which the optical beam enters the polarized beam splitter, the speckle noise reduction device reducing speckle noise in the optical beam caused by interference with a feed back beam from the side of the polarized beam splitter.

2. The scan type image display device according to claim 1, wherein:
    three optical sources are provided as the optical source which each emit a red, green, and blue optical beam; and
    the scan type image display device further includes a cross prism which the three optical beams enter to be combined to form a single optical beam.

3. The scan type image display device according to claim 1, wherein:
    three optical sources are provided as the optical source which each emit a red, green, and blue optical beam; and
    the scan type image display device further includes a combined mirror which the three optical beams enter to be combined to form a single optical beam.

4. The scan type image display device according to claim 2, further comprising:
    a common collimating lens which converts the optical beam combined by the cross prism into a substantially parallel optical beam and corrects chromatic aberrations of each beam from the three optical sources.

5. The scan type image display device according to claim 3, further comprising:
    a common collimating lens which converts the optical beam combined by the combined mirror into a substantially parallel optical beam and corrects chromatic aberrations of each beam from the three optical sources.

* * * * *